(12) United States Patent
Chang et al.

(10) Patent No.: US 9,038,651 B2
(45) Date of Patent: May 26, 2015

(54) SWITCHING VALVE (71) Applicant: Globe Union Industrial Corp., Taichung (TW)

(72) Inventors: Chunghsiang Chang, Taichung (TW); Chungyu Kuo, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 215 days.

(21) Appl. No.: 13/787,897

(22) Filed: Mar. 7, 2013

(65) Prior Publication Data

US 2014/0054484 A1 Feb. 27, 2014

(30) Foreign Application Priority Data

Aug. 24, 2012 (CN) .......................... 2012 2 0422168

(51) Int. Cl.
*F16K 11/048* (2006.01)
*F16K 17/04* (2006.01)
*F16K 1/34* (2006.01)

(52) U.S. Cl.
CPC ................. *F16K 1/34* (2013.01); *F16K 11/048* (2013.01); *E03C 2201/30* (2013.01)

(58) Field of Classification Search
CPC ....... F16K 1/34; F16K 11/048; B05B 1/1627; E03C 1/023; E03C 2201/30
USPC .................................. 137/119.04, 625.5, 881
See application file for complete search history.

(56) References Cited

U.S. PATENT DOCUMENTS

| | | | | |
|---|---|---|---|---|
| 3,706,325 A * | 12/1972 | Pauliukonis | ............. | 137/625.66 |
| 4,114,645 A * | 9/1978 | Pauliukonis | ............. | 137/596.17 |
| 5,472,010 A * | 12/1995 | Gonzalez | ................. | 137/119.08 |
| 6,123,096 A * | 9/2000 | Kammonen | ................... | 137/270 |
| 6,561,210 B2 * | 5/2003 | Hsieh et al. | ............. | 137/119.04 |
| 6,920,892 B2 * | 7/2005 | Agresta et al. | ........... | 137/119.04 |
| 6,978,795 B2 * | 12/2005 | Perrin | ....................... | 137/119.04 |

FOREIGN PATENT DOCUMENTS

CN               201606557 U      10/2010

\* cited by examiner

*Primary Examiner* — John K Fristoe, Jr.
*Assistant Examiner* — Seth W Mackay-Smith
(74) *Attorney, Agent, or Firm* — Alan D. Kamrath; Kamrath IP Lawfirm, P.A.

(57) ABSTRACT

A switching valve contains a sleeve member, a plug member, and a damping spring. The sleeve member includes a watering segment, a spraying segment, a peripheral fence, a side fence, a channel, a first watering chamber, and a second watering chamber. The peripheral fence has a first valve seat, a second valve seat, and at least one set of inlet. The first valve seat has a conical first closing face and a plurality of stop blocks. The second valve seat has a conical second closing face. The plug member includes a first sealing portion, a second sealing portion, and guiding ribs. The first sealing portion has a first ring, and the second sealing portion has a second ring. Each guiding rib has a guide face, and between any two adjacent guiding ribs is defined a slot. The damping spring is mounted between the side fence and the plug member.

9 Claims, 9 Drawing Sheets

SWITCHING VALVE

FIELD OF THE INVENTION

The present invention relates to switch valve.

BACKGROUND OF THE INVENTION

CN Patent No. 201606557U discloses that a conventional switching valve is installed in a body of a faucet assembly. The conventional switching valve includes a sleeve member and a plug member sliding along the sleeve member. In a normal operation state, water flows out of an outlet of the faucet assembly via the sleeve member, the plug member, a gap between an upper O ring and an upper valve seat of the plug member. Accordingly, when a lever of a spray head is operated, a water pressure in the switching valve changes so that the plug member slides downward, such that the upper O ring is biased against the upper valve seat, thus stopping a water supply from the faucet assembly. In the meantime, the water flows to the spray head through the sleeve member and a clearance between a lower O ring and a lower valve seat.

However, such a conventional switching valve still has the following disadvantages:

1. The plug member is hollow so that a chamber is defined in the plug member and two sets of holes formed around the chamber so as to flow water. But the plug member is metal formed and machined at high cost.

2. The upper O ring is forced by the water pressure, thus causing a deformation. In addition, water leaks from the gap between the upper O ring and the upper valve seat easily, thus having a water leakage from the faucet assembly.

3. As changing water supply from a faucet mode to a spray head mode, the plug member moves to the spray head quickly, so the upper O ring of the plug member collides the upper valve seat to result in vibration and noises.

4. As changing water supply from a spray head mode to a faucet mode, the flow capacity decreases to cause a back pressure, so the plug member switches to the spray head and the faucet assembly, hence the plug member swings constantly. Also, when an inflow pressure is not stable, the plug member vibrates as well.

The present invention has arisen to mitigate and/or obviate the afore-described disadvantages.

SUMMARY OF THE INVENTION

The primary object of the present invention is to provide switching valve which is capable of overcoming the shortcomings of the conventional switching valve.

To obtain the above objectives, a switching valve provided by the present invention contains: a sleeve member, a plug member, and a damping spring.

The sleeve member is cylindrical and includes a watering segment, a spraying segment opposite to the watering segment, a peripheral fence, a side fence connecting with the peripheral fence and defined on the spraying segment; a channel defined between the peripheral fence and the side fence, a first watering chamber communicating with the channel and formed adjacent to the watering segment and a second watering chamber communicating with the channel and formed proximate to the spraying segment. The peripheral fence has a first valve seat arranged on a connection of the channel and the first watering chamber, a second valve seat formed on a connection of the channel and the second watering chamber, and at least one set of inlet defined around a middle section of the channel. The first valve seat has a conical first closing face defined thereon and a plurality of stop blocks isometrically extending outward from the first closing face to the first watering chamber, and between two adjacent stop blocks is defined a gap so as to flow water increasely. The second valve seat has a conical second closing face defined thereon.

The plug member is cylindrical and inserts into the channel of the sleeve member, the plug member includes a first sealing portion and a second sealing portion opposite to the first sealing portion. The first sealing portion has a first ring disposed thereon so that when the plug member moves toward the spraying segment, the first sealing portion closes the first closing face of the first valve seat, and each stop block is applied to limit a radial deformation of the first ring. The second sealing portion has a second ring fixed thereon so that when the plug member moves toward the watering segment, the second sealing portion closes the second closing face of the second valve seat. The plug member also includes a plurality of guiding ribs isometrically arranged between the first sealing portion and the second sealing portion. And each guiding rib having a guide face defined on an outer wall thereof so as to slide the plug member in the channel of the sleeve member, thus limiting a tilted swing of the plug member, and between any two adjacent guiding ribs being defined a slot communicating with the at least one set of inlet, such that when the first ring of the plug member disengages from the first closing face of the sleeve member, and the slot communicates with the first watering chamber.

The damping spring is mounted between the side fence of the sleeve member and the plug member so as to push the second ring of the plug member to close the second closing face of the sleeve member.

Thereby, the plug member is formed in a cylinder shape to eliminate an inner chamber and an orifice of the conventional switching valve, thus lowering production cost.

The plug member includes the plurality of guiding ribs and the four slots between the plurality of guiding ribs so as to flow the water toward the outlet via the four slots and to move the plug member smoothly, thereby stabilizing water supply.

The plug member also includes the plurality of stop blocks so as to limit the radial deformation of the first ring, thus obtaining the closing effect and preventing a water leakage from the outlet. In addition, the gap is used for increasing water flow, thus enhancing the water capacity between the four slots and the first watering chamber.

The damping spring is used to stabilize an operation of the plug member as changing water supply from the spray head to the faucet assembly, thus stabilizing water supply from the faucet assembly.

The constant-flow space is designed in a certain size so as to control the water capacity in a stable range. In other words, the water supply from the spray head will not be influenced by a change of the clearance between the second ring and the second closing face.

The side fence has the hole formed on the central position thereof, and the hole is in the 2.5-5 mm of diameter so as to prevent spoiler or turbulence as the water flows into the second watering chamber via the constant-flow space, such that the plug member operates smoothly and sufficient water capacity is achieved.

DETAILED DESCRIPTION OF THE PREFERRED EMBODIMENTS

Referring further to FIGS. 1-4, a switching valve 1 according to a preferred embodiment of the present invention comprises: a sleeve member 10, a plug member 20, and a damping spring 30.

Figure 5:
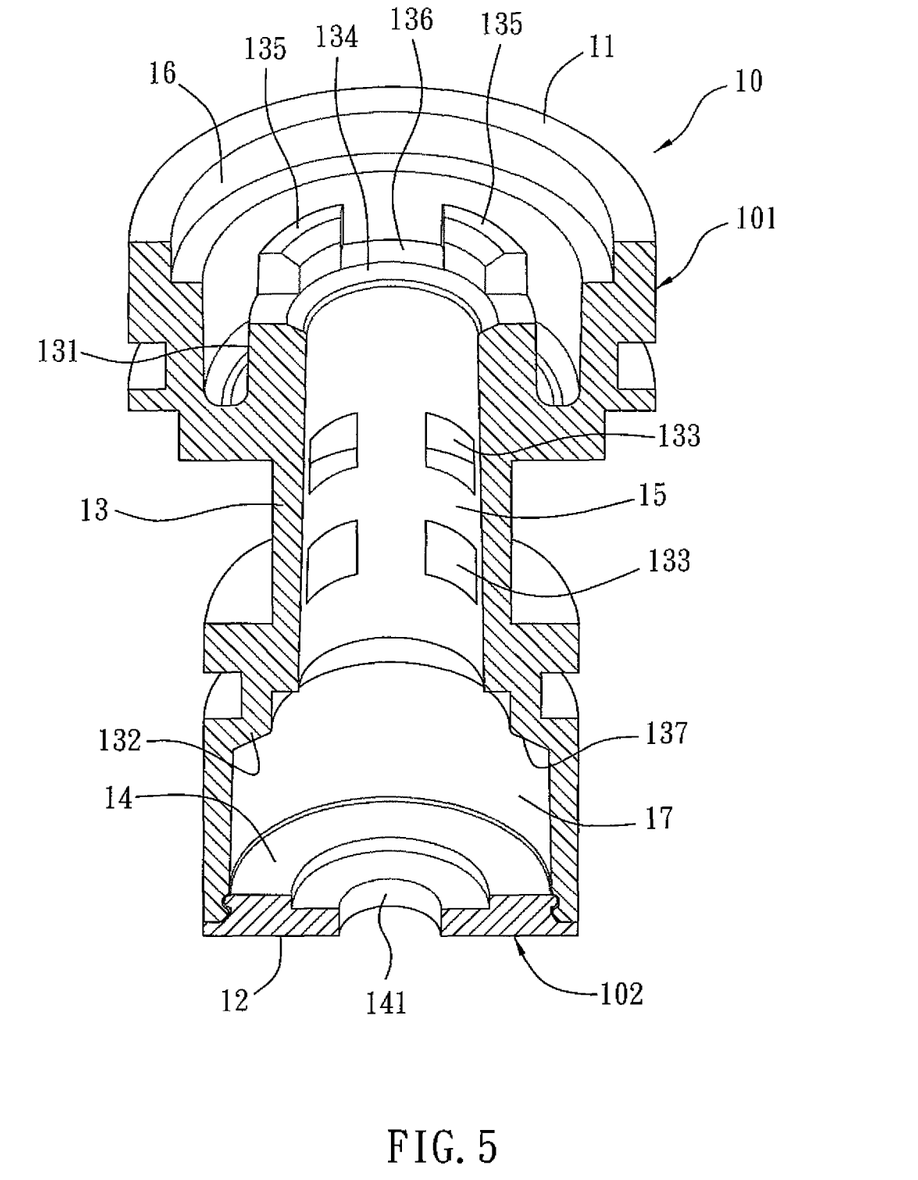
FIG. 5 is a cross-sectional perspective view showing the assembly of a sleeve member of the switching valve according to the preferred embodiment of the present invention.

As shown in FIG. 5, the sleeve member 10 is cylindrical and includes a watering segment 11, a spraying segment 12 opposite to the watering segment 11, a peripheral fence 13, a side fence 14 connecting with the peripheral fence 13 and defined on the spraying segment 12, a channel 15 defined between the peripheral fence 13 and the side fence 14, a first watering chamber 16 communicating with the channel 15 and formed adjacent to the watering segment 11, and a second watering chamber 17 communicating with the channel 15 and formed proximate to the spraying segment 12. The peripheral fence 13 has a first valve seat 131 arranged on a connection of the channel 15 and the first watering chamber 16, a second valve seat 132 formed on a connection of the channel 15 and the second watering chamber 17, and at least one set of inlet 133 defined around a middle section of the channel 15. In this embodiment, two sets of inlets 133 are defined around the middle section of the channel 15, and each set of inlet 133 has four inlets. The first valve seat 131 has a conical first closing face 134 defined thereon and a plurality of stop blocks 135 isometrically extending outward from the first closing face 134 to the first watering chamber 16. In this embodiment, four stop blocks 135 isometrically extend outward from the first closing face 134 to the first watering chamber 16. Between two adjacent stop blocks 135 is defined a gap 136 so as to flow water increasely. The second valve seat 132 has a conical second closing face 137 defined thereon.

The side fence 14 of the sleeve member 10 has a hole 141 formed on a central position thereof and communicating with the second watering chamber 17, the hole 14 is circular and has a 2.5-5 mm of diameter.

To manufacture the switching valve easily, the sleeve member 10 is comprised of a housing 101 and a cover 102 retained with the housing 101, wherein a main part of the sleeve member 10 includes the housing 101, and the cover 102 is used to form the side fence 14.

Figure 6:
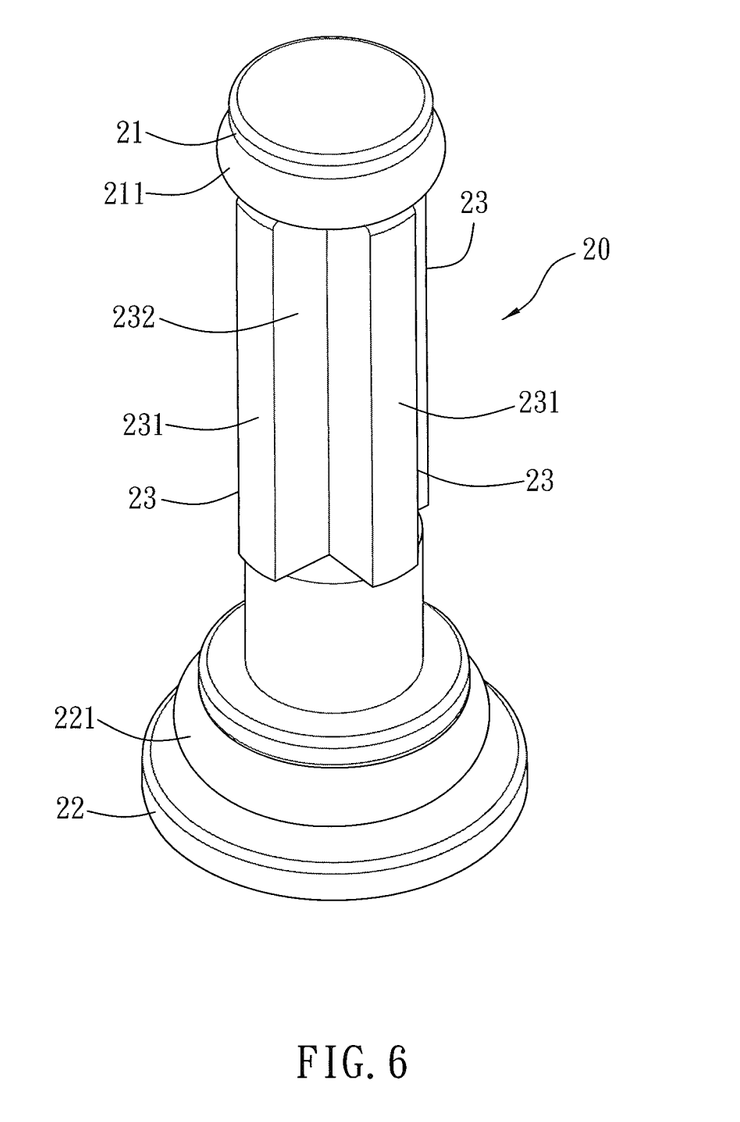
FIG. 6 is a perspective view showing the assembly of a plug member of the switching valve according to the preferred embodiment of the present invention.

As illustrated in FIG. 6, the plug member 20 is cylindrical and inserts into the channel 15 of the sleeve member 10, the plug member 20 includes a first sealing portion 21 and a second sealing portion 22 opposite to the first sealing portion 22. The first sealing portion 21 has a first ring 211 disposed thereon so that when the plug member 20 moves toward the spraying segment 12, the first sealing portion 21 closes the first closing face 134 of the first valve seat 131, and each stop block 135 is applied to limit a radial deformation of the first ring 211, thus obtaining a closing effect. The second sealing portion 22 has a second ring 221 fixed thereon so that when the plug member 20 moves toward the watering segment 11, the second sealing portion 22 closes the second closing face 137 of the second valve seat 132. The plug member 20 also includes a plurality of guiding ribs 23 isometrically arranged between the first sealing portion 21 and the second sealing portion 22. In this embodiment, four guiding ribs 23 are isometrically arranged between the first sealing portion 21 and the second sealing portion 22, and each guiding rib 23 has a crisscross cross section and a guide face 231 defined on an outer wall thereof so as to slide the plug member 20 in the channel 15 of the sleeve member 10, thus limiting a tilted swing of the plug member 20. Also, between any two adjacent guiding ribs 23 is defined a slot 232 communicating with the at least one set of inlet 133. In this embodiment, four slots 232 are isometrically arranged so that when the first ring 211 of the plug member 20 disengages from the first closing face 134 of the sleeve member 10, and the four slots 232 communicate with the first watering chamber 16.

Figure 1:
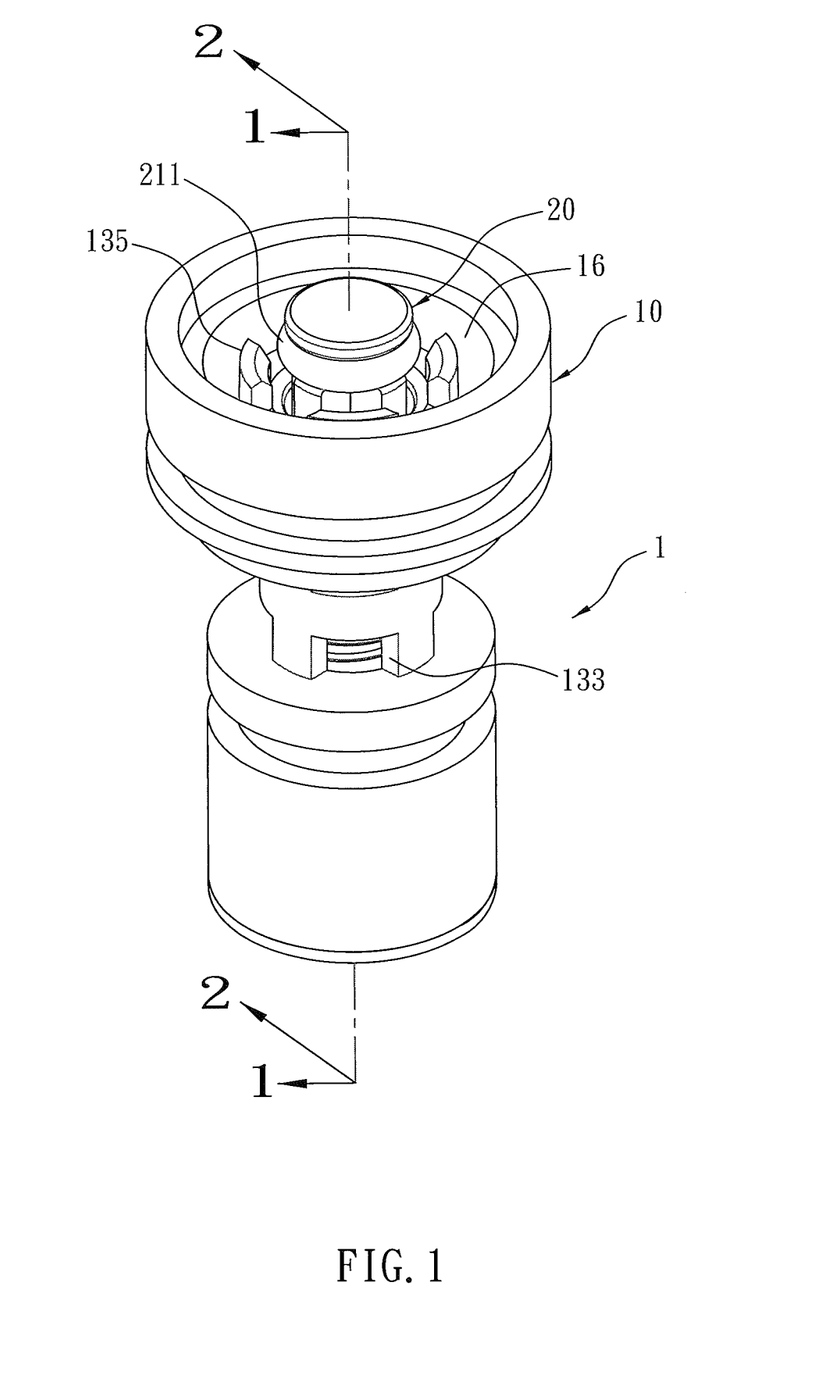
FIG. 1 is a perspective view showing the assembly of a switching valve according to a preferred embodiment of the present invention.
Figure 2:
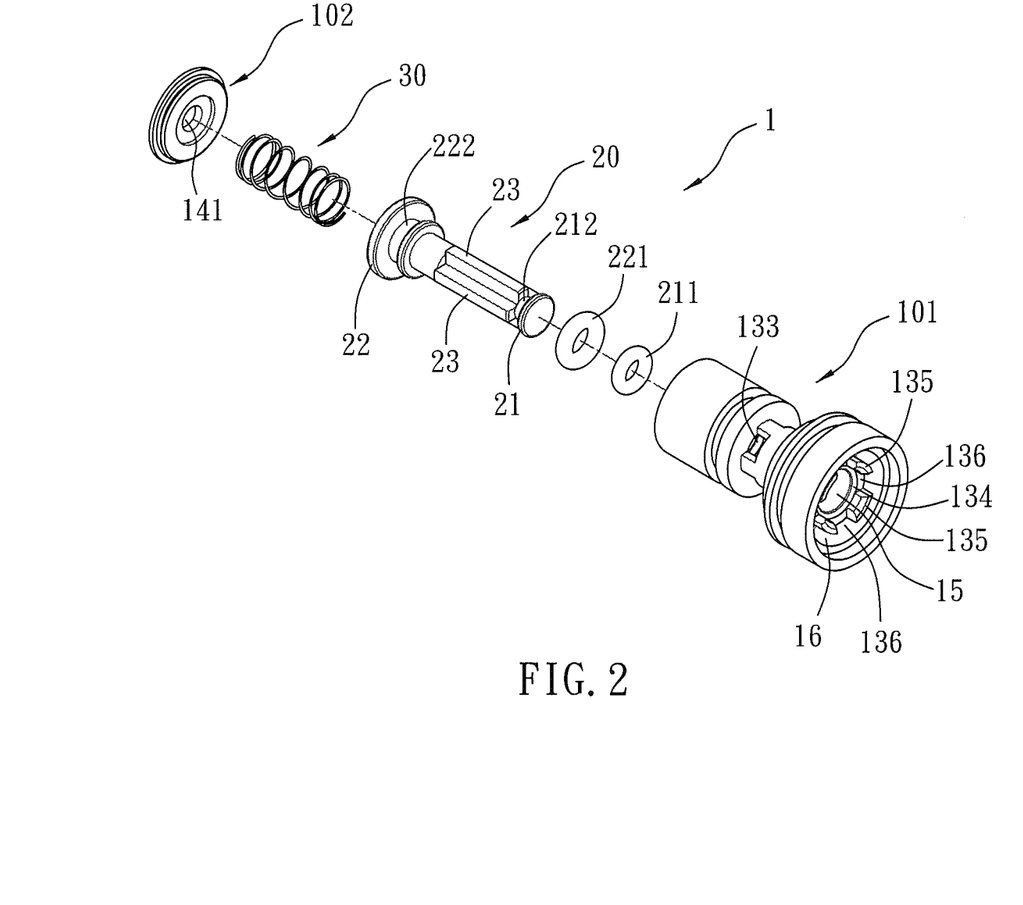
FIG. 2 is a perspective view showing the exploded components of the switching valve according to the preferred embodiment of the present invention.
Figure 3:
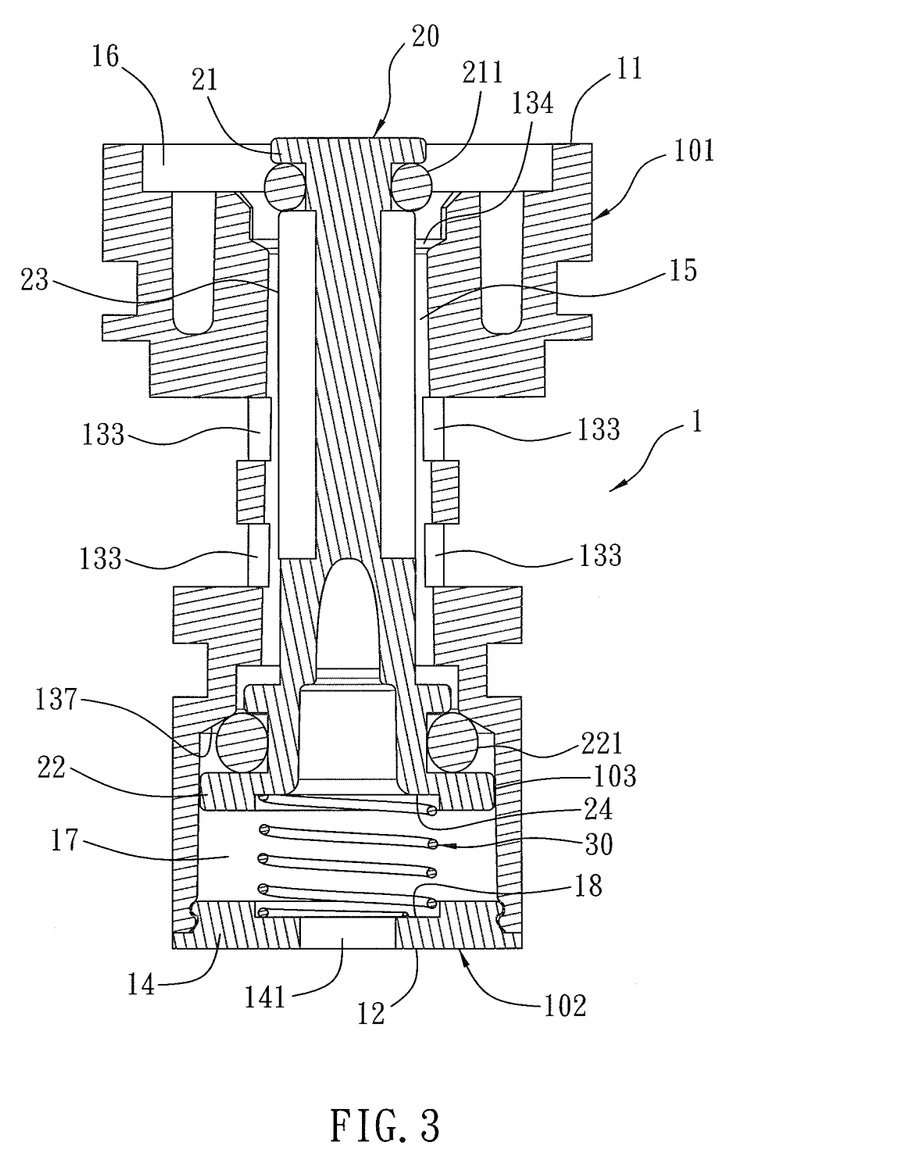
FIG. 3 is a cross sectional view taken along the lines 1-1 of FIG. 1.
Figure 4:
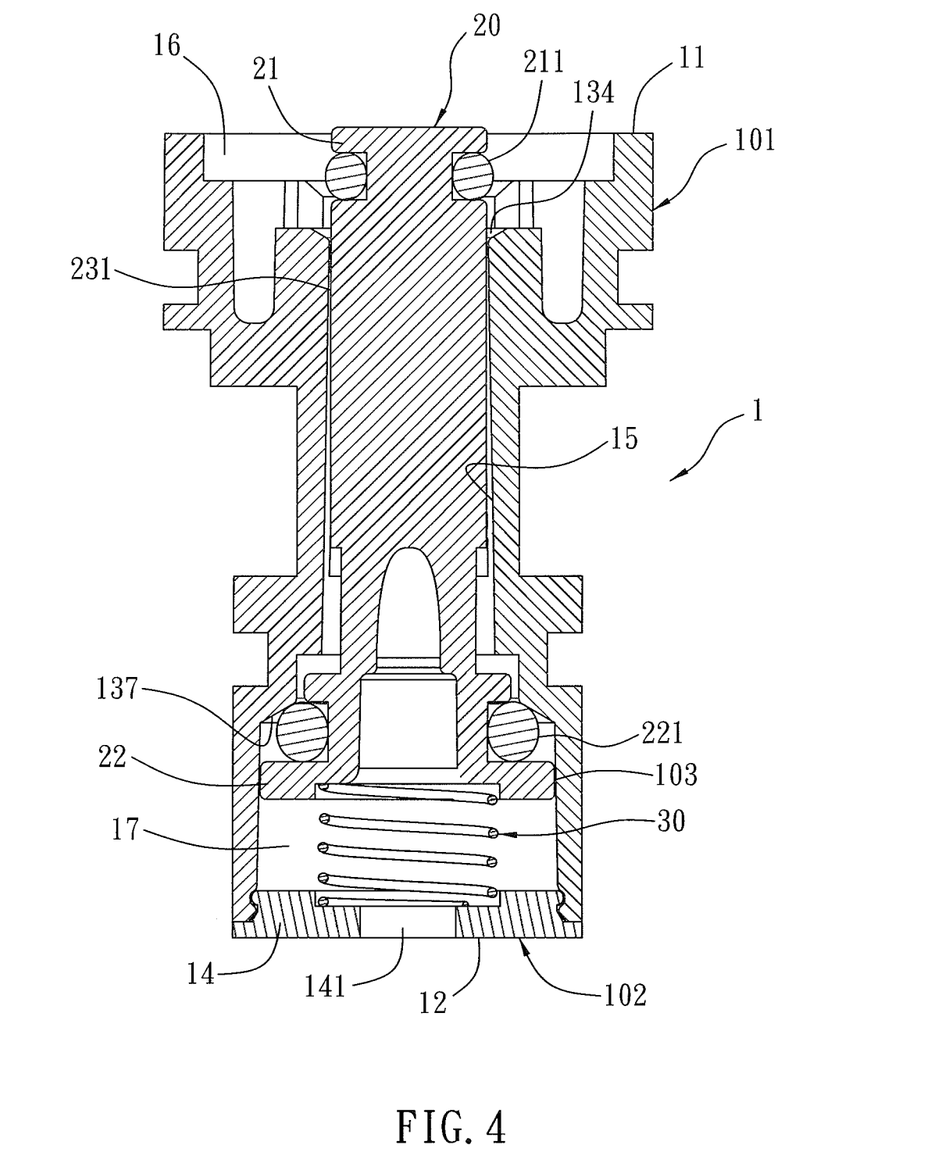
FIG. 4 is a cross sectional view taken along the lines 2-2 of FIG. 1.

The first ring 211 and the second ring 221 are an O ring made of rubber material, as illustrated in FIG. 2 the first sealing portion 21 has a first recess 212 for receiving the first ring 211, and the second sealing portion 22 has a second recess 222 for receiving the second ring 221. It is to be noted that the four slots 232 communicate with the first recess 212 so that when the first ring 211 disengages from the first closing face 134, water in the four slots 232 flows toward the first watering chamber 16 quickly, and then after the water flows through a slit between the first ring 211 and the first closing face 134, it further flows into the first watering chamber 16 strongly by ways of the gap 136.

The plug member 20 smoothly slides in the channel 15 of the sleeve member 10 by using four guide faces 231 of the four guiding ribs 23, and the four slots 232 allow the water to flow therethrough, so when a ratio of a total circumference of the four guide faces 231 against a length of the channel 15 is large, a flow capacity of the four slots 232 is low. On the contrary, when the ratio is small, an area of the four guide faces 231 is accordingly small to enhance a pressure on the area of the four guide face 231, thus causing an abrasion to decrease service life of the plug member. Therefore, the ratio of the total circumference of the four guide faces 231 against the length of the channel 15 is 0.2 to 0.5.

Between the second recess 222 and the second watering chamber 17 is defined a constant-flow space 103 so as to control the water capacity in a predetermined range. A size of the constant-flow space 103 is 0.03-0.15 mm.

The damping spring 30 is mounted between the side fence 14 of the sleeve member 10 and the plug member 20 so as to push the second ring 221 of the plug member 20 to close the second closing face 137 of the sleeve member 10.

To install the damping spring 30 easily, a first groove 18 is arranged on the side fence 14 of the sleeve member 10, and a second groove 24 is defined on the plug member 20, such that two ends of the damping spring 30 abut against the first groove 18 and the second groove 24.

Figure 9:
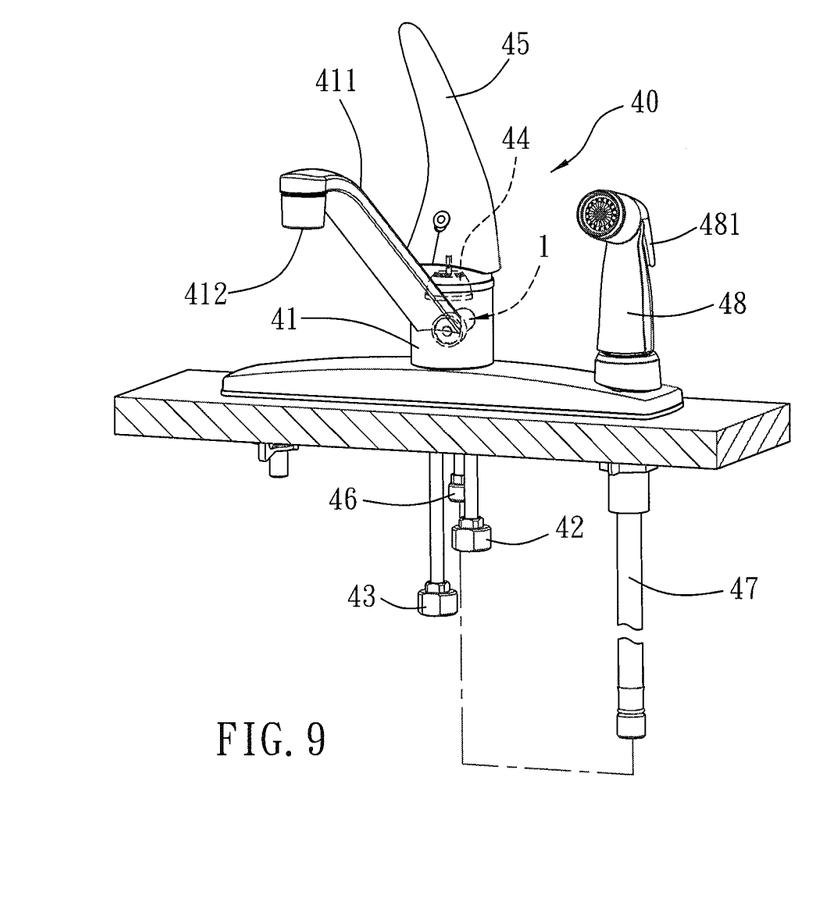
FIG. 9 is a perspective view showing the application of the switching valve according to the preferred embodiment of the present invention.

Referring further to FIG. 9, the switching valve 1 is fixed in a faucet assembly 40 of a kitchen. The faucet assembly 40 includes a body 41, a cold-water connector 42, a hot-water connector 43, a mixing valve 44 for flowing cold water from a cold-water supply tube and hot water from a hot-water supply tube into the body 40, a handle 45 for turning on or off the mixing valve 44 and for adjusting a mixing ratio of the cold water and the hot water. When the mixing valve 44 is turned on, the cold water, the hot water or a mixed water of the cold water and the hot water is supplied to the switching valve 1. The body 41 has an outlet pipe 411, an outlet 412 formed on a distal end of the outlet pipe 411, a mixed-water connector 46 connected with a bottom end of the body 41 and a hose 47 which is fixed on the faucet assembly 40, and a spray head 48. The spray head 48 has an operating lever 481 disposed thereon.

Figure 7:
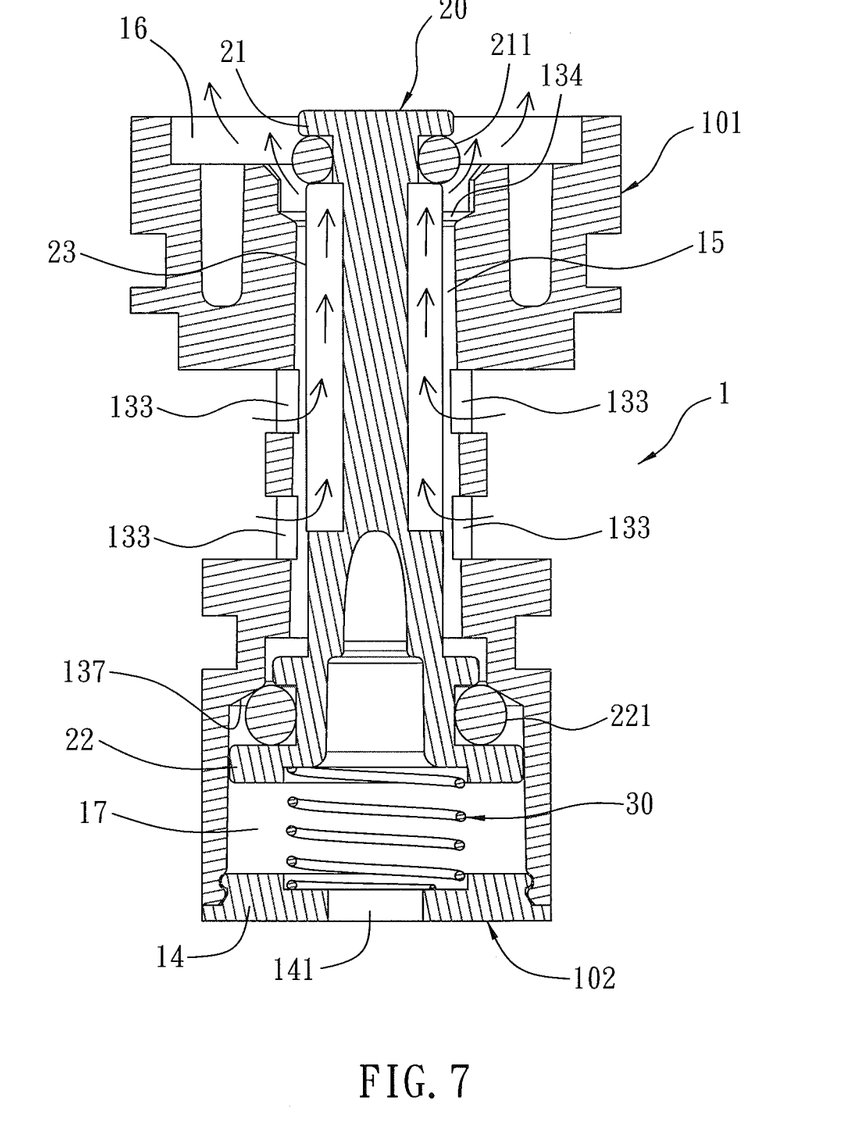
FIG. 7 is a cross sectional view showing the operation of the switching valve according to the preferred embodiment of the present invention.

With reference to FIG. 7, when the mixed water flows into the at least one set of inlet 133 from the mixing valve 44, it further flows to the first watering chamber 16 via the four slots 232, the slit between the first ring 211 and the first closing face 134, and the gap 136, thus flowing the mixed water out of the outlet 412.

Figure 8:
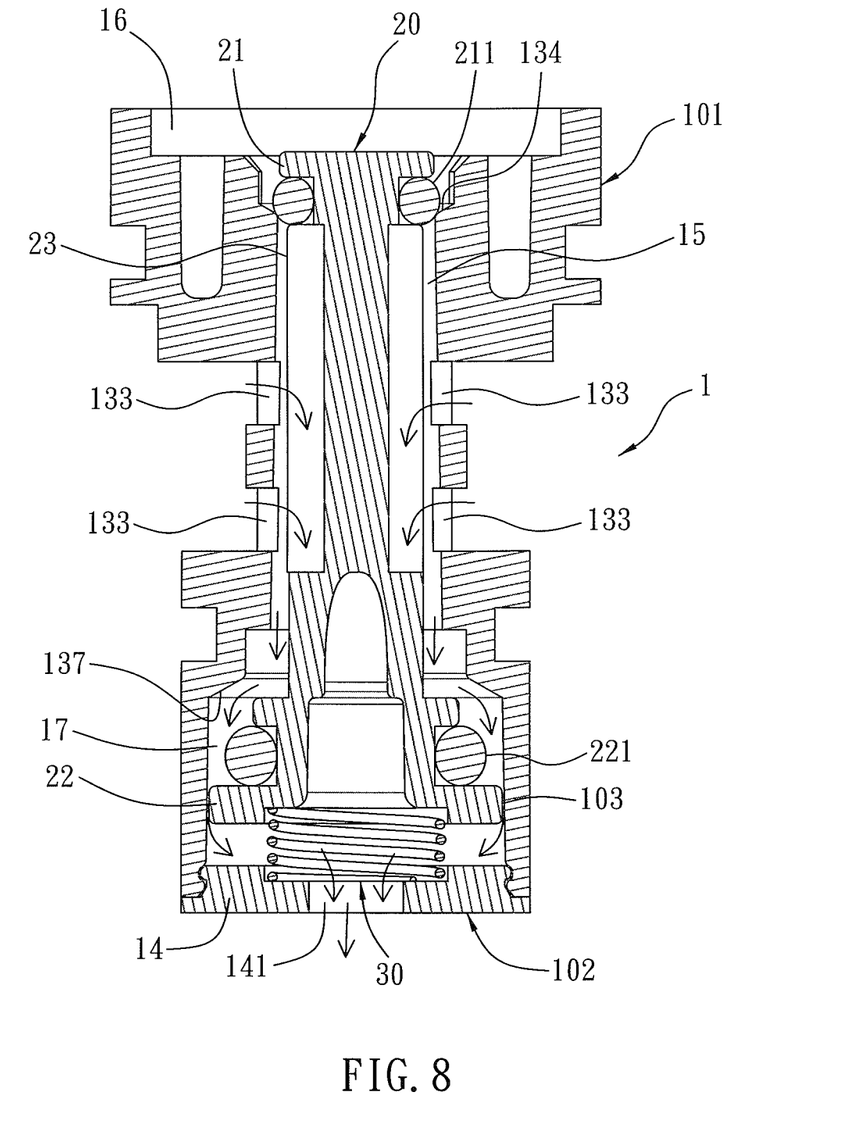
FIG. 8 is another cross sectional view showing the operation of the switching valve according to the preferred embodiment of the present invention

As shown in FIG. 8, when the operating lever 481 of the spray head 48 is pressed, a water pressure in the switching valve 1 changes so that the plug member 20 moves toward the spraying segment 12, and then the second ring 221 disengages from the second closing face 137 so that the water in the switching valve 1 flows toward the spray head 48 through a clearance between the second ring 221 and the second closing face 137, the constant-flow space 103, and the second watering chamber 17, thereby flowing the water out of the spray head 48.

It is to be noted that when the second ring 221 disengages from the second closing face 137, the first ring 211 closes the first closing face 134 so as to stop water flowing out of the watering segment 11, thus stopping water supply from the watering segment 11 and flowing the water out of the spray head 48. Also, when the operating lever 481 of the spray head 48 is released, the plug member 20 is changed by the water pressure to move toward the watering segment 11, thus flowing the water out of the faucet assembly 40.

Thereby, the plug member 20 is formed in a cylinder shape to eliminate an inner chamber and an orifice of the conventional switching valve, thus lowering production cost.

The plug member 20 includes the plurality of guiding ribs 23 and the four slots 232 between the plurality of guiding ribs 23 so as to flow the water toward the outlet 412 via the four slots 232 and to move the plug member 20 smoothly, thereby stabilizing water supply.

The plug member 20 also includes the plurality of stop blocks 135 so as to limit the radial deformation of the first ring 211, thus obtaining the closing effect and preventing a water leakage from the outlet 412. In addition, the gap 136 is used for increasing water flow, thus enhancing the water capacity between the four slots 232 and the first watering chamber 16.

The damping spring 30 is used to stabilize an operation of the plug member 20 as changing water supply from the spray head to the faucet assembly, thus stabilizing water supply from the faucet assembly.

The constant-flow space 103 is designed in a certain size so as to control the water capacity in a stable range. In other words, the water supply from the spray head will not be influenced by a change of the clearance between the second ring 221 and the second closing face 137.

The side fence 14 has the hole 141 formed on the central position thereof, and the hole 141 is in the 2.5-5 mm of diameter so as to prevent spoiler or turbulence as the water flows into the second watering chamber 17 via the constant-flow space 103, such that the plug member 20 operates smoothly and sufficient water capacity is achieved.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A switching valve comprising:
  a sleeve member being cylindrical and including a watering segment, a spraying segment opposite to the watering segment, a peripheral fence, a side fence connecting with the peripheral fence and defined on the spraying segment; a channel defined between the peripheral fence and the side fence, a first watering chamber communicating with the channel and formed adjacent to the watering segment and a second watering chamber communicating with the channel and formed proximate to the spraying segment; the peripheral fence having a first valve seat arranged on a connection of the channel and the first watering chamber, a second valve seat formed on a connection of the channel and the second watering chamber, and at least one set of inlets defined around a middle section of the channel; the first valve seat having a conical first closing face defined thereon and a plurality of stop blocks isometrically extending outward from the first closing face to the first watering chamber, and between two adjacent stop blocks being defined a gap that allows increased water flow; the second valve seat having a conical second closing face defined thereon;
  a plug member being cylindrical and inserting into the channel of the sleeve member, the plug member including a first sealing portion and a second sealing portion opposite to the first sealing portion; the first sealing portion having a first ring disposed thereon so that when the plug member moves toward the spraying segment, the first sealing portion closes the first closing face of the first valve seat, and each stop block being applied to limit a radial deformation of the first ring; the second sealing portion having a second ring fixed thereon so that when the plug member moves toward the watering segment, the second sealing portion closes the second closing face of the second valve seat; the plug member also including a plurality of guiding ribs isometrically arranged between the first sealing portion and the second sealing portion; and each guiding rib having a guide face defined on an outer wall thereof so as to slide the plug member in the channel of the sleeve member, thus limiting a tilted swing of the plug member, and between any two adjacent guiding ribs being defined a slot communicating with the at least one set of inlet, such that when the first ring of the plug member disengages from the first closing face of the sleeve member, and the slot communicates with the first watering chamber;
  a damping spring mounted between the side fence of the sleeve member and the plug member so as to push the second ring of the plug member to close the second closing face of the sleeve member.

2. The switching valve as claimed in claim 1, wherein the sleeve member includes four stop blocks isometrically extending outward from the first closing face to the first watering chamber.

3. The switching valve as claimed in claim 1, wherein the first sealing portion has a first recess for receiving the first ring; the slot communicates with the first recess.

4. The switching valve as claimed in claim 1, wherein four guiding ribs are isometrically arranged between the first sealing portion and the second sealing portion, and each guiding rib has a crisscross cross section.

5. The switching valve as claimed in claim 1, wherein a ratio of a total circumference of the four guide faces against a length of the channel is 0.2 to 0.5.

6. The switching valve as claimed in claim 1, wherein the side fence of the sleeve member has a hole formed on a central position thereof and communicating with the second watering chamber, and the hole is circular and has a 2.5-5 mm of diameter.

7. The switching valve as claimed in claim 1, wherein the second sealing portion has a second recess for receiving the second ring; between the second recess and the second watering chamber is defined a constant-flow space, and a size of the constant-flow space is 0.03-0.15 mm.

8. The switching valve as claimed in claim 1, wherein a first groove is arranged on the side fence of the sleeve member so that two ends of the damping spring abut against the first groove and a second groove.

9. The switching valve as claimed in claim 1, wherein the sleeve member is comprised of a housing and a cover retained with the housing, and the cover is used to form the side fence.

* * * * *